United States Patent [19]
Grosgebauer

[11] 3,767,142
[45] Oct. 23, 1973

[54] RELEASE MECHANISM FOR FLARE PARACHUTE

[75] Inventor: Roger A. Grosgebauer, Ogden, Utah

[73] Assignee: Thiokol Chemical Corporation, Bristol, Pa.

[22] Filed: Feb. 3, 1972

[21] Appl. No.: 223,159

[52] U.S. Cl. .............................. 244/147, 102/35.6
[51] Int. Cl. ........................................... B64d 17/78
[58] Field of Search .................... 244/113, 147–150, 244/152, 142; 102/37.6, 34.4, 35.4, 35.6

[56] References Cited
UNITED STATES PATENTS

| | | | |
|---|---|---|---|
| 3,038,407 | 6/1962 | Robertson et al. | 102/35.4 X |
| 3,196,693 | 7/1965 | Cooper | 244/150 X |

*Primary Examiner*—Duane A. Reger
*Assistant Examiner*—Paul E. Sauberer
*Attorney*—Edward E. McCullough

[57] ABSTRACT

A mechanism for releasing a drogue parachute from an aerial flare has a plurality of radial fingers that retain the mechanism in the flare case by extending beneath a shoulder or into an indentation therein. Each of the radial fingers is also confined under a radially extending tab on a central collar. A base plate, concentric with the collar, has pins that extend through slots in the fingers to prevent their rotation in the plane of the base plate. A tension spring attached at one end to the base plate and at the other end to the collar exerts force to rotate the collar relative to the base plate. It is kept under tension by a retaining pin inserted through aligned holes in the base plate and collar. A load pin, one end of which is attached to the drogue parachute, extends centrally through the collar and base plate. The opposite end of the load pin is equipped with a flange that attaches to the retaining pin. This flange is also equipped with a shear pin that extends through an ear that is perpendicular to the load plate. A compression spring surrounds the load pin and is confined between the inside end of a hollow guide, fixed to the load plate and the load pin flange. The shock produced by opening of the drogue parachute breaks the shear pin and allows the decelerating force produced by the drogue parachute to be supported by the base plate until the deceleration approaches a desired, terminal velocity. At that time, the compression spring operates to withdraw the retaining pin from the collar, allowing it to be rotated by the tension spring. This rotation moves the radial tabs of the collar away from the ends of the fingers, so that they are no longer confined thereby. The fingers then fall out of the flare, releasing the entire mechanism, together with the drogue parachute.

6 Claims, 2 Drawing Figures

Patented Oct. 23, 1973 3,767,142

RELEASE MECHANISM FOR FLARE PARACHUTE

CROSS REFERENCES TO RELATED APPLICATIONS

This application is somewhat related to three other applications owned by the same assignee: "Release Mechanism for Flare Parachute" by Gary V. Adams, filed Feb. 17, 1972, Ser. No. 223,145; "Aerial Flare with Drogue Parachute" by J. R. Thurston, filed June 11, 1971, Ser. No. 152,204; and "Aerial Flare and Parachute Deployment Therefore" by W. F. Davis, et al; filed Dec. 26, 1968, Ser. No. 787,079, now U.S. Pat. No. 3,593,664.

BACKGROUND OF THE INVENTION

This invention relates to mechanisms for releasing parachutes from aerial flares. Particularly, it relates to mechanisms for releasing drogue parachutes from flares deployed from high-speed aircraft. The invention described herein was made during the course of or under a contract with the U.S. Air Force.

When flares are deployed from aircraft traveling at speeds of the order of 650 knots, two undesirable results commonly occur. First, the flare goes into a high velocity spin that tends to stop or slow down timing mechanisms for deployment of the main parachute. Second, such velocities are great enough to destroy the main parachute if it were to be deployed without some means of slowing the flare. Hence, as described in the second application cited above, a drogue parachute has been used effectively in slowing the flare for safe deployment of the main parachute. Although the invention cited in that application was effective for this purpose, it has been found desirable to separate the drogue parachute completely from the flare after it has served its purpose, so that it cannot fall back and interfere with the function of the main parachute.

SUMMARY OF THE INVENTION

The present invention, which fills this need, is a force-actuated release mechanism that is operated by the drogue parachute itself. A central pin, or load pin, fixed at one end to a lanyard of the drogue parachute, has an outwardly-extending flange on its other end. This load pin extends through a compression spring and centrally through a base plate that is somewhat smaller in diameter than the interior of the flare case, the compression spring being effectively confined between the base plate and the flange of the load pin. The load pin also concentrically extends through a central collar on the drogue parachute side of the load plate. A plurality of radial fingers are confined under radial tabs on the central collar and extend outward to fit under a shoulder in the flare case for confining the mechanism therein. Each radial finger is prevented from rotation in the plane of the base plate. A tension spring, attached at one end to the base plate, and at the other end to the collar, exerts force to rotate the collar relative to the load plate. However, this spring is kept under tension by a pin, attached to the flange on the load pin, that extends through aligned holes in the base plate and the collar.

Until deployment of the drogue parachute, a shear pin on the load pin flange extends through an ear on the base plate to maintain the load pin in a fixed position relative to the mechanism. When the drogue parachute is deployed by a static line attached to the aircraft, the force of such deployment breaks the shear pin and permits the compression spring to absorb the shock of the sudden load on the drogue parachute. Then, as the velocity of the flare approaches a predetermined, terminal velocity, the compression spring overcomes the pull of the drogue parachute and withdraws the retaining pin from its hole in the collar, permitting rotation thereof to remove the radial tabs on the collar from the fingers. This releases the radial fingers, and the entire mechanism described together with the drogue parachute, from the flare so that the main parachute can then be deployed.

Objects of the invention are to provide a mechanism for releasing a drogue parachute from an aerial flare that has been deployed at high speed, after the drogue parachute has performed its function of slowing the flare to a predetermined terminal velocity. Important features of the invention are it structural simplicity, reliability, and simplicity of manufacture.

Other objects and features of the invention will become apparent as the following detailed description is read with reference to the accompanying drawings, wherein the same parts are designated by the same numerals throughout the disclosure.

DESCRIPTION OF THE PREFERRED EMBODIMENTS

Figure 1:
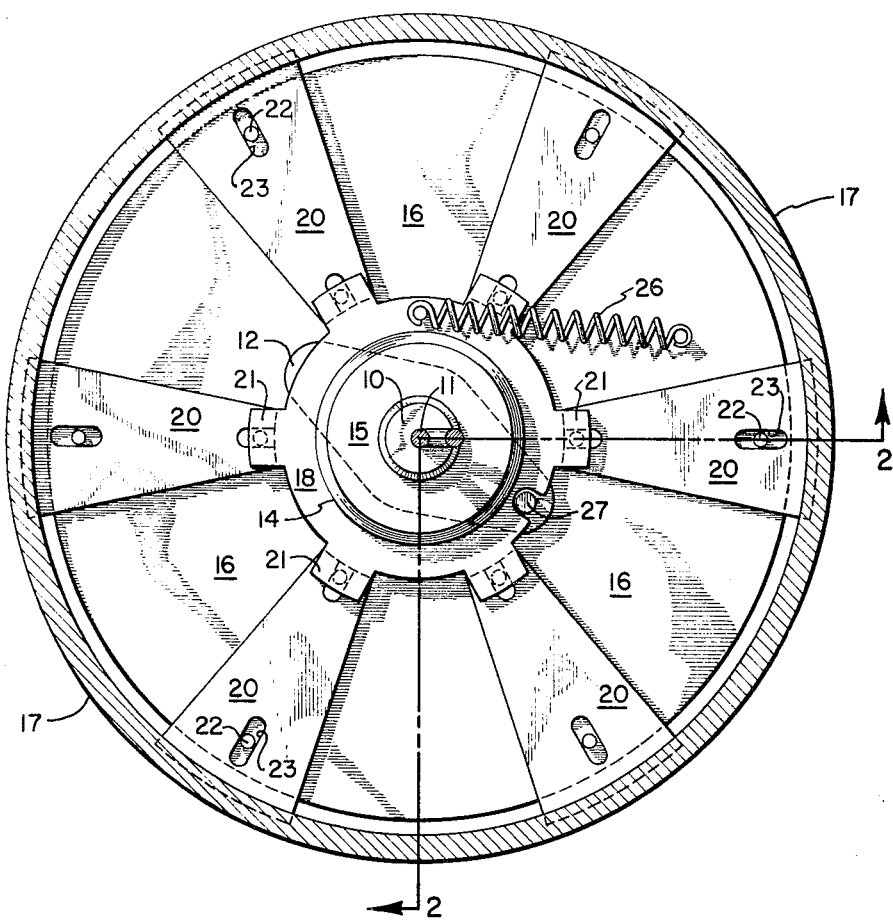
FIG. 1 is a plan view of the invention.
Figure 2:
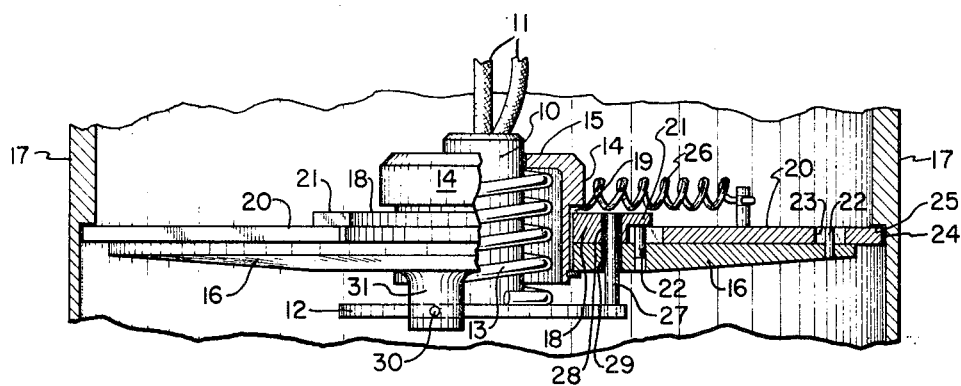
FIG. 2 is a side view of the invention, partially in section.

As shown in the Figures, a load pin 10 is attached at one end to a lanyard 11 that is in turn fastened to the drogue parachute (not shown). The other end of the load pin 10 is equipped with a flange 12. A compression spring 13 surrounds the load pin 10 inside a cylindrical guide 14 having an inwardly extending flange 15 on one end thereof, the compression spring being confined between the flange 12 and the flange 15. A circular base plate 16, somewhat smaller in diameter than the inside surface of the flare case 17, concentrically surrounds the guide 14 and holds a collar 18 that is confined between the base plate 16 and the shoulder 19 on the guide. A plurality of radial fingers 20 are confined beneath radial tabs 21 on the collar 18 at their inner ends and are intermediately restrained from rotation in the plane of the base plate 16 by pairs of pins 22 fixed to the base plate and extending through slots 23 in the fingers 20. The outer ends 24 of these fingers 20 extend beneath a shoulder 25 in the inner surface of the flare case 17. A tension spring 26 is attached at one end to the base plate 16 and at its other end to the collar 18, so that it may exert force on the collar to rotate it relative to the base plate. This spring, however, is normally maintained under tension by a retaining pin 27 attached to the flange 12 and extending through aligned holes 28 and 29 in the base plate and collar, respectively, to prevent relative movement thereof.

The flange 12 on the end of the load pin 10 is equipped with a shear pin 30 that extends through an ear 31 on the base plate. By this means, the load pin 10 is kept in place until the mechanism is actually used.

The drogue parachute, not shown, is normally deployed from high-speed aircraft by a static line attached to the aircraft that starts automatic timing mechanisms and is easily released from the drogue parachute. When the drogue parachute is filled with air, the sudden shock breaks the shear pin 30 and allows the compression spring 13 to absorb the shock, thereby preventing damage to the drogue parachute and the flare. Then, as the flare is slowed to a predetermined terminal velocity, the compression spring 13 overcomes the opposite force exerted by the drogue parachute and withdraws the retaining pin 27. This permits rotation of the collar 18 by the tension spring, releasing the radial fingers 20 from under the tabs and from under the shoulder 25 of the flare case to release the mechanism and drogue parachute from the flare case.

An invention has been described that constitutes an advance in the art of deploying aerial flares from high-speed aircraft. Although the preferred embodiment of the invention has been described with considerable specificity regarding details, it should be noted that such details may be altered without departing from the scope of the invention as it is defined in the following claims.

The invention claimed is:

1. In an aerial flare having a cylindrical case with a shoulder therein and a drogue parachute, the improvement comprising apparatus for automatically releasing the drogue parachute from the flare, after it has decreased the velocity of the flare sufficiently, comprising:
   a base plate having a central hole and a smaller diameter than that of the inside of the flare case;
   a central load pin attached at one end to the drogue parachute and having an outwardly extending flange fixed to its other end, the pin extending through the central hole of the base plate;
   a compression spring surrounding the central pin and operatively confined between the flange thereof and the base plate;
   a shear pin attaching the load pin to the base plate for fixing the normal position of the load pin relative thereto;
   a collar surrounding the load pin and having a plurality of radially extending tabs;
   a plurality of radially extending fingers, each confined at one end under one of the tabs and at its other end under the shoulder in the flare case;
   means for preventing rotation of the fingers in the plane of the base plate;
   spring means for biasing the collar to rotate relative to the base plate; and
   a retaining pin operatively fixed to the central pin and extending through aligned holes in the base plate and collar, whereby the spring means may be maintained under tension.

2. The aerial flare of claim 1 wherein the spring means is a tension spring attached at one end to the base plate and at the other end to the collar.

3. The aerial flare of claim 1 wherein the means for preventing rotation of the fingers comprises at least two pins fixed to the base plate and extending through slotted holes in each finger.

4. The aerial flare of claim 1 further including a cylindrical guide fixed in the central hole of the base plate and surrounding the central load pin and its compression spring, the guide having an inwardly projecting flange on the end thereof that is opposite the flange on the central pin, so that the spring may be confined between the flanges.

5. Apparatus for automatically releasing a drogue parachute from an aerial flare having a cylindrical case with a shoulder therein, comprising:
   a base plate having a central hole and a smaller diameter than the interior of the flare case;
   a central load pin attached at one end to the drogue parachute and having an outwardly extending flange on the other end thereof;
   a compression spring surrounding the load pin and confined between the flange thereof and the base plate;
   a shear pin attaching the central pin to the base plate, that may be broken when the drogue parachute is deployed;
   a collar surrounding the central pin and having radially extending tabs thereon;
   a plurality of fingers, each confined at one end under one of the tabs and at its other end under the shoulder of the flare case, whereby the mechanism may be retained therein;
   spring means biasing the collar to rotate relative to the base plate;
   means for preventing rotation of the collar until the drogue parachute has decreased the velocity of the flare; and
   means for preventing rotation of the fingers in the plane of the base plate.

6. The apparatus of claim 5 wherein the means for preventing rotation of the collar comprises a retaining pin fixed to the flange of the load pin and passing through aligned holes in the base plate and collar, whereby the collar is prevented from rotating until the force exerted on the load pin by the drogue parachute becomes weaker than the opposing force of the compression spring, whereupon the compression spring may withdraw the retaining pin from the aligned holes to permit rotation of the collar.

* * * * *